(12) United States Patent
Comtesse

(10) Patent No.: US 9,546,007 B2
(45) Date of Patent: Jan. 17, 2017

(54) METHOD AND DEVICE FOR THE SUCCESSIVE LAUNCHING OF TWO SATELLITES

(75) Inventor: Patrick Comtesse, Mézières (FR)

(73) Assignee: ASTRIUM SAS, Suresnes (FR)

(*) Notice: Subject to any disclaimer, the term of this patent is extended or adjusted under 35 U.S.C. 154(b) by 156 days.

(21) Appl. No.: 14/003,280

(22) PCT Filed: Mar. 6, 2012

(86) PCT No.: PCT/FR2012/050460
§ 371 (c)(1),
(2), (4) Date: Oct. 4, 2013

(87) PCT Pub. No.: WO2012/120232
PCT Pub. Date: Sep. 13, 2012

(65) Prior Publication Data
US 2014/0027578 A1    Jan. 30, 2014

(30) Foreign Application Priority Data

Mar. 9, 2011 (FR) ...................................... 11 00706

(51) Int. Cl.
*B64G 1/00* (2006.01)
*B64G 1/64* (2006.01)
*B64G 1/10* (2006.01)

(52) U.S. Cl.
CPC .............. *B64G 1/002* (2013.01); *B64G 1/1085* (2013.01); *B64G 1/641* (2013.01)

(58) Field of Classification Search
CPC ................................................ B64G 2001/643
USPC ........................................... 244/173.1, 173.3
See application file for complete search history.

(56) References Cited

U.S. PATENT DOCUMENTS

| 5,613,653 | A | * | 3/1997 | Bombled et al. | .......... 244/173.1 |
| 6,059,234 | A | * | 5/2000 | Mueller et al. | ............ 244/173.1 |
| 6,138,951 | A | * | 10/2000 | Budris et al. | ............... 244/173.3 |
| 6,296,206 | B1 | * | 10/2001 | Chamness et al. | ........ 244/173.3 |
| 6,416,018 | B2 | * | 7/2002 | DiVerde et al. | ........... 244/137.1 |
| 6,513,760 | B1 | * | 2/2003 | Mueller et al. | ............ 244/171.1 |
| 6,789,767 | B2 | * | 9/2004 | Mueller et al. | ............ 244/173.3 |
| 7,219,859 | B2 | * | 5/2007 | Johnson et al. | ........... 244/159.1 |

(Continued)

FOREIGN PATENT DOCUMENTS

WO    2008034550    3/2008

OTHER PUBLICATIONS

Chanut F, et al., "La Structure du Systeme de Lancement Double Ariane Sylda", Aeronautique et L'Astronautique, Air et Cosmos, Paris, FR, No. 5, Jan. 1, 1984, pp. 18-23.

(Continued)

*Primary Examiner* — Brian M O'Hara
*Assistant Examiner* — Keith L Dixon
(74) *Attorney, Agent, or Firm* — Duane Morris LLP; J. Rodman Steele, Jr.; Gregory M. Lefkowitz

(57) ABSTRACT

According to the invention, a link is established between the fixed part (4A) and the removable part (4B) of an enclosure (4) in which the second satellite is previously enclosed, said link being such that said removable part (4B) remains attached to said fixed part (4A) when said removable part (4B), initially in a first position for which said enclosure (4) is closed and encloses said second satellite, lies in a second position for which said enclosure (4) is open and able to release said satellite.

7 Claims, 3 Drawing Sheets

(56) References Cited

U.S. PATENT DOCUMENTS

| | | |
|---|---|---|
| 7,780,119 B2 * | 8/2010 | Johnson et al. ........... 244/173.1 |
| 2005/0103220 A1 | 5/2005 | Cleveland |
| 2008/0078887 A1 | 4/2008 | Gaigler |

OTHER PUBLICATIONS

Molette P., "Sylda Systeme De Lancement Double Ariane Configuration et Definition de la Structure," Aeronautique et L'Astronautique, Air et Cosmos, Paris, FR, No. 74, Oct. 17, 1978, pp. 12-20.

Molette P., "Sylda Systeme De Lancement Double Ariane Configuration et Definition de la Structure," Aeronautique et L'Astronautique. Air et Cosmos, Paris, FR, No. 74, Oct. 17, 1978, pp. 12-20.

* cited by examiner

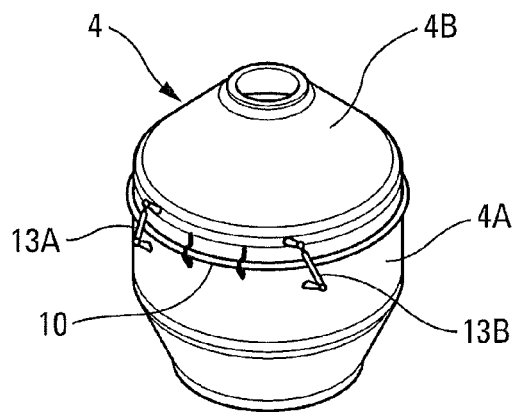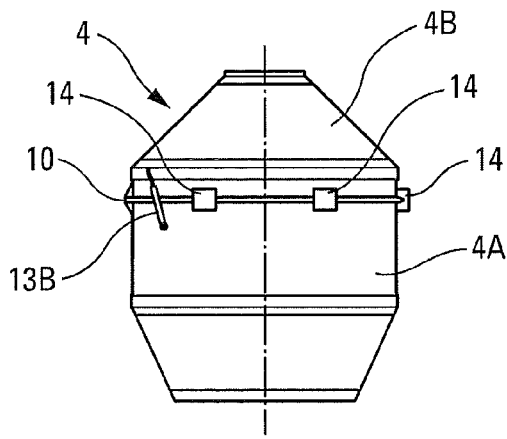
Fig. 2
Fig. 3
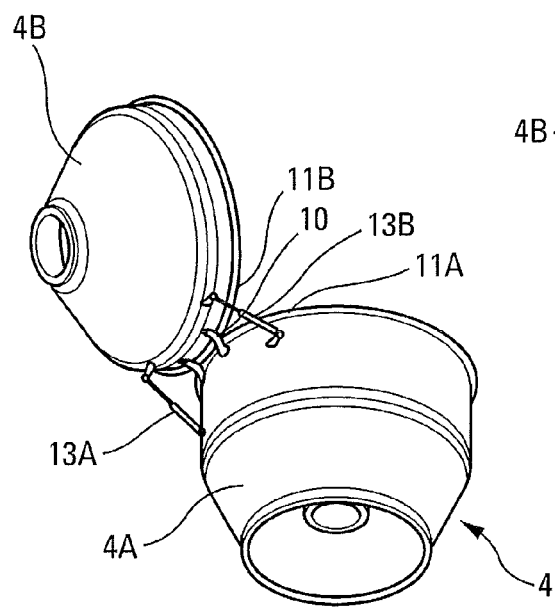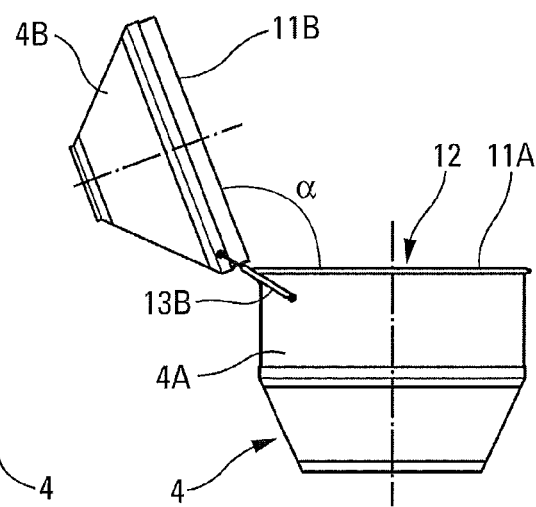
Fig. 4
Fig. 5

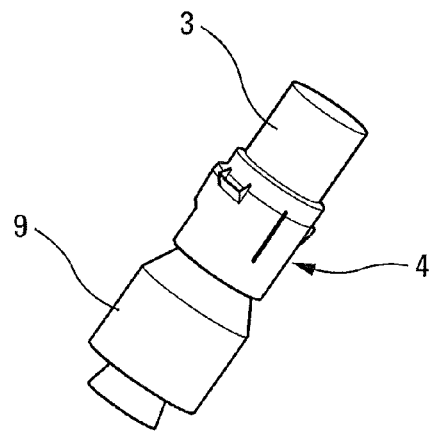
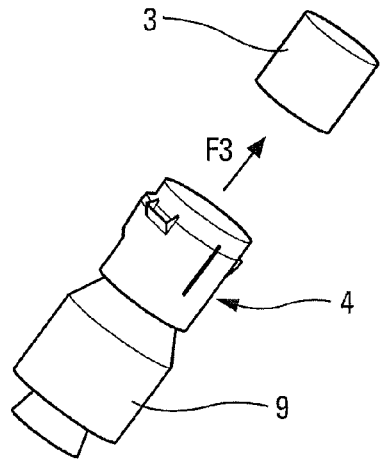
Fig. 6A   Fig. 6B
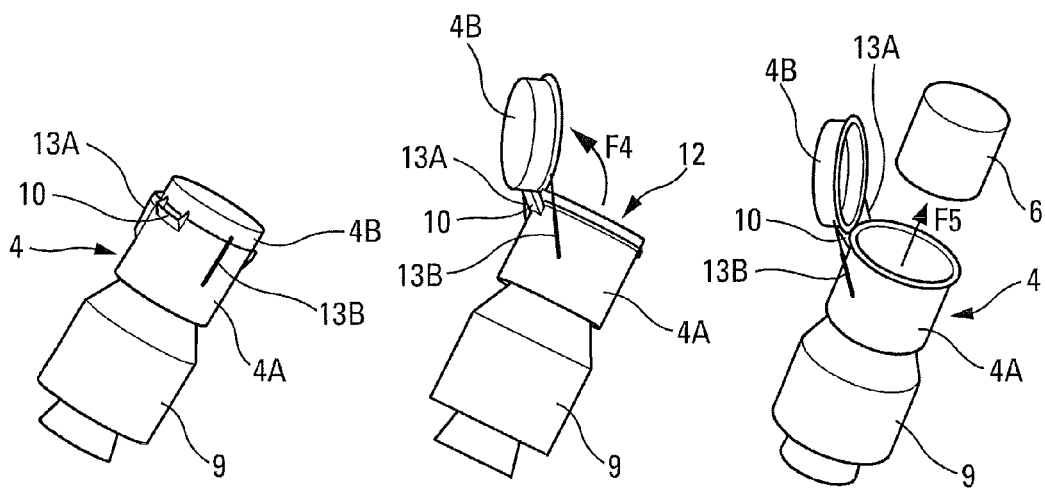
Fig. 6C   Fig. 6D   Fig. 6E

METHOD AND DEVICE FOR THE SUCCESSIVE LAUNCHING OF TWO SATELLITES

CROSS-REFERENCE TO RELATED APPLICATIONS

This application is a §371 national stage entry of International Application No. PCT/FR2012/050460, filed Mar. 6, 2012, which claims priority to French Patent Application No. 1100706 filed Mar. 9, 2011, the entire contents of which are incorporated herein by reference.

The present invention relates to a method and to a device for the successive launching of two satellites.

It is known that a device for launching satellites can carry a first satellite in its upper part and can also enclose a second satellite in an enclosure provided for this purpose, this enclosure having a fixed part and a removable part, this removable part being capable of assuming two successive positions, namely a first position for which the enclosure is closed and encloses the second satellite, and a second position for which the enclosure is open and capable of releasing said second satellite. Regardless of the position of the removable part of the enclosure, the fixed part is fixed to the launching device. Auxiliary satellites, of smaller dimensions, can also be connected to the periphery of the enclosure.

This launching device, once in space, is directed to the orbit of the first satellite, where this satellite is then separated from said device. Consequently, the device is remote from the orbit of the first satellite, then the removable part of the enclosure enclosing the second satellite is detached, which makes it possible, when said device reaches the orbit of said second satellite, to release this satellite.

Once the first and the second satellite are launched in this way, the launching device can be directed to a neutralisation orbit (so-called graveyard orbit) or to an orbit enabling its destruction by atmospheric reentry.

However, during such a launch, when the removable part of the enclosure (and possibly other attached components such as a connecting strap, separation mechanism, pyrotechnic devices, etc.) is detached from the launching device, this removable part is ejected into space where it then constitutes debris which cannot be definitively destroyed and therefore contributes to the pollution of extra-atmospheric space.

The object of the present invention is to enable launching of a satellite previously enclosed in an enclosure, without however being the source of debris likely to pollute extra-atmospheric space.

To this end, according to the invention, the method of successively launching two satellites, the first satellite being attached to an enclosure in which the second satellite is previously enclosed, said first satellite being capable of being separated from said enclosure, said enclosure including a fixed part and a removable part, said removable part being capable of passing, after separation of said first satellite and said enclosure, from a first position for which said enclosure is closed and encloses said second satellite to a second position for which said enclosure is open and capable of releasing said second satellite, is remarkable in that a connection is established between said fixed part and said removable part, such that when said removable part is in said second position, said removable part remains attached to said fixed part.

Thus, by means of the invention, when the enclosure is open with a view to releasing the second satellite, the removable part of said enclosure is displaced whilst remaining connected to the fixed part of said enclosure. Consequently, instead of being ejected into extra-atmospheric space, the removable part can be routed, with the rest of the launching device, towards a site conducive to its destruction (or its neutralisation) and therefore will not constitute debris likely to pollute extra-atmospheric space. It follows that the extra-atmospheric pollution generated by the launching of a satellite enclosed in such an enclosure is significantly reduced.

For the implementation of the method of launching according to the present invention, a device for successively launching two satellites, the first satellite being disposed in the upper part of said device and attached to an enclosure by first connection/separation means, the second satellite being previously enclosed in the enclosure, said enclosure including a fixed part and a removable part, said removable part being capable of passing, after separation of said first satellite and said enclosure, from a first position for which said enclosure is closed and encloses said second satellite to a second position for which said enclosure is open and capable of releasing said second satellite, is remarkable in that it also includes means for connection between said fixed part and said removable part, said connection means being arranged so that when said removable part is in said second position, said removable part remains attached to said fixed part.

In order that the second satellite may be correctly ejected from the enclosure whilst ensuring that the removable part remains attached to the fixed part of the enclosure, the connection means are also arranged so that when said removable part is in its second position, said fixed part and said removable part provide an opening in the enclosure through which the second satellite can be released.

The connection means preferably comprise a hinge-type connection, which makes it possible to open the enclosure by making the removable part tilt by pivoting about an axis.

The connection means may also comprise of means for initiation and damping of the movement of the removable part when said removable part passes from its first position to its second position, which makes it possible to avoid abrupt movement of said removable part.

In this case, the initiation and damping means may for example comprise pneumatic springs fixed to the fixed part and to the removable part respectively, which enables not only tilting, but also braking at the end of the movement and non-return of said removable part. The initiation and damping means may also be directly integrated into the connection means.

In order to launch the second satellite remotely, the removable part can be capable of passing from its first position to its second position under the action of controllable closing/opening means.

The figures of the appended drawings will enable a good understanding of how the invention can be carried out. On these drawings, identical reference signs designate similar elements.

FIG. 2 shows a perspective view of an enclosure according to the present invention which is capable of being integrated into the launching device of FIG. 1 when the removable part is in its first position.

FIG. 3 shows a profile view of the enclosure of FIG. 2,

FIG. 4 shows a perspective view of the enclosure in FIGS. 2 and 3 when the removable part is in its second position.

FIG. 5 shows a profile view of the enclosure in FIG. 4.

FIGS. 6A to 6E show perspective views of the launching device in FIG. 1 into which the enclosure in FIGS. 2 to 5 is integrated during successive stages of launching of the two satellites.

Figure 1:
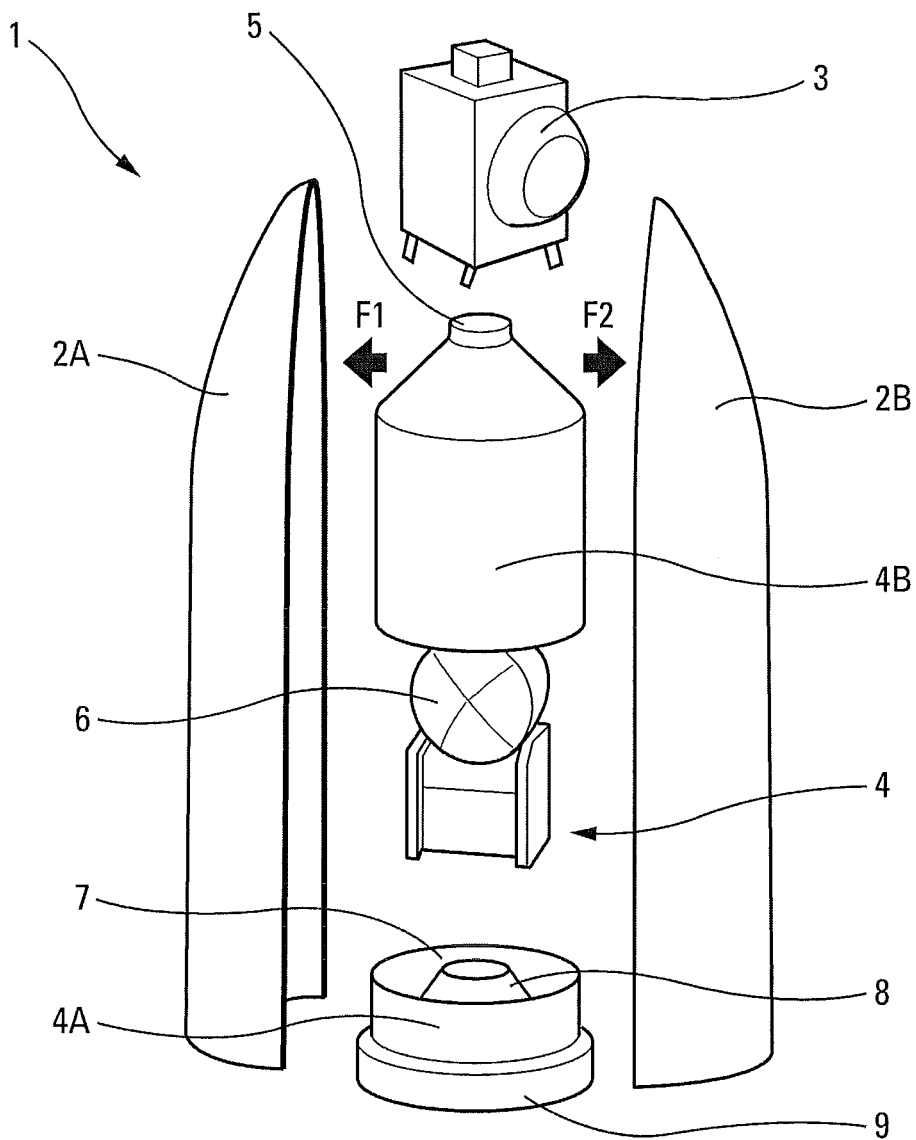
FIG. 1 shows an exploded perspective view of a device for launching two satellites according to the prior art.

The launching device 1 shown schematically in FIG. 1 and capable of being sent into space by a launcher (not shown) includes two shells 2A and 2B, the assembly of which forms a cover which serves to protect the satellite during the movement of the device 1 in the atmosphere, said shells 2A and 2B then being separated from said device 1 in order to enable the subsequent release of said satellites.

This device 1 also carries two principal satellites, including a first satellite 3 disposed in the upper part of said device and attached to an enclosure 4 by first connection/separation means 5, and a second satellite 6 enclosed in the enclosure 4. Other auxiliary satellites of dimensions smaller than the satellites 3 and 6 may be accommodated at locations specifically created on the external side wall of the enclosure 4.

According to the prior art presented with regard to FIG. 1, the enclosure 4 has a fixed part 4A and a removable part 4B. The removable part 4B is disposed initially in a first position for which the enclosure 4 is closed and thus encloses the second satellite 6. In this case, the removable part 4B rests on the fixed part 4A of the enclosure 4, said removable part 4B and said fixed part 4A being attached to one another by second connection/separation means (not shown).

During the operation of the launching device 1, the shells 2A and 2B of the cover are separated from one another and also from the rest of the device in two substantially opposing directions shown respectively by the arrows F1 and F2 in FIG. 1. Once the shells 2A and 2B are sufficiently far apart and the device 1—after several manoeuvres and changes of attitude—has reached the orbit of the first satellite 3, the first connection/separation means 5 are activated so that said first satellite 3, retained until then by said first connection/separation means 5, is separated from the launching device 1 and set on its orbit.

The launching device 1 then proceeds to additional manoeuvres and changes of attitude in order to reach another orbit. Once this orbit is reached, the second connection/separation means are activated so that the removable part 4B is separated from the fixed part 4A of the enclosure 4—and thus even from the device 1. The removable part 4B then passes from its first position to its second position for which the enclosure 4 is open, as shown in FIG. 1. The launching device 1 then proceeds to additional manoeuvres and changes of attitude in order to reach the orbit of the second satellite 6. The second satellite 6 can then be launched into space through opening created by the detachment of said removable part 4B, and can thus be set on its orbit.

In order to ensure that the second satellite 6 is fixed inside the enclosure 4, then separated from said enclosure 4 when the removable part 4B is itself detached, additional connection/separation means 7 are disposed on the fixed part 4A of said enclosure 4 and are connected to the second satellite 6 by means of an adapter 8.

Once the launching of the two satellites 3 and 6 has been effected, the fixed part 4A of the enclosure 4 remains joined to the rest of the launching device 1 (of which only the upper element 9 is shown on FIG. 1), whilst the removable part 4B thereof is ejected into extra-atmospheric space, where it then constitutes polluting debris.

This drawback is remedied in accordance with the present invention by means of a specific configuration of the enclosure 4, of which an example is shown in FIGS. 2 to 5. In this enclosure 4 according to the present invention, the fixed part 4A and the removable part 4B are attached to one another by connection means 10 arranged so as to create in the enclosure 4 an opening through which the second satellite 6 can be released when said removable part 4B—initially in its first position (FIGS. 2 and 3)—is in its second position (FIGS. 4 and 5), but without said removable part 4B being detached from said fixed part 4A—and hence from the device 1.

In the example of FIGS. 2 to 5, the connection means 10 are formed by a hinge-type connection, installed respectively on the upper rim 11A of the fixed part 4A and the lower rim 11B of the removable part 4B. Thus, starting from its first position for which the enclosure 4 is closed (FIGS. 2 and 3), the removable part 4B can pivot about the articulation formed by the connection means 10 in order to reach its second position (FIGS. 4 and 5), for which an opening 12 (FIG. 5) is created in said enclosure 4 in order to enable release of the satellite 6.

It will be noted that the hinge-type connection shown in FIGS. 2 to 5 can be replaced by any appropriate rotation means to enable the removable part 4B to tilt, for example one or more Carpentier joints.

It will also be noted that, in the configuration described with regard to FIGS. 2 to 5, the angle a (FIG. 5) formed by the respective rims 11A and 11B is preferably greater than 90°, so that the satellite 6 can be ejected from the enclosure 4 without risk of colliding with the removable part 4B and being damaged thereby.

The enclosure 4 is also provided with means 13A and 13B for initiation and damping of the movement of the removable part 4B, intended on the one hand to initiate the movement of said removable part 4B from its first position towards its second position and on the other hand to damp the movement of said removable part 4B when this removable part reaches its second position. These initiation and damping means may for example be in the form of pneumatic springs 13A and 13B fixed respectively to the fixed part 4A and to the removable part 4B, which makes it possible to ensure, when said removable part 4B is displaced towards its second position, not only tilting, but also braking at the end of the movement and non-return of said removable part 4B. These initiation and damping means may likewise be integrated directly into the connection means 10, when these means are formed by a hinge of which pivoting can be damped, such as for example one or more Carpentier joints.

The enclosure 4 can also be equipped with remote-controllable closing/opening means 14 (shown in FIG. 3), which make it possible to initiate the pivoting of the removable part 4B about the connection means 10. These closing/opening means 14 join the fixed part 4A and the removable part 4B of the enclosure 4 to one another on the rims 11A and 11B, and are distributed along said rims 11A and 11B. The closing/opening means 14 may for example be formed by pyromechanical nuts which enable the physical connection of the removable part 4B to the fixed part 4A in the first position of said removable part 4B, then the separation of said parts 4A and 4B at the location of said pyromechanical nuts, by electrical means. It will be noted that this controllable opening function can likewise be carried out by other suitable means such as strap connections, electromechanical systems, and also any other type of connection system capable of being used in a satellite launching device without generating debris during the performance of this function.

FIGS. 6A to 6E illustrate the successive steps of launching two satellites by means of a launching device such as that of FIG. 1 in which the enclosure of FIGS. 2 to 5 is integrated.

When the launching device 1, equipped with two satellites (FIG. 6A), of which a first satellite 3 is disposed in the upper part of said device 1 and a second satellite is enclosed inside a closed enclosure 4 attached to the rest 9 of said device 1, has reached the orbit of the first satellite 3, said first satellite 3 is separated from said device 1 (FIG. 6B), in the direction of the arrow F3, and set on its orbit.

The launching device 1 is then routed towards the orbit of the second satellite (FIG. 6C), where the removable part 4B, until then in its first position for which it closes the enclosure 4 and encloses said second satellite, is driven towards its second position (FIG. 6D), in the direction of the arrow F4, under the action of the closing/opening means 14 of FIG. 3 (not shown in FIGS. 6A to 6E). During this movement of the removable part 4B, this part remains connected to the rest of the enclosure 4 by means of the connection means 10 and damping means 13A and 13B described above. An opening 12 is thus created in the enclosure 4 with a view to releasing the second satellite.

The second satellite 6 is thus released from the enclosure 4 (FIG. 6E), in the direction of the arrow F5, in order to be set on its orbit. The removable part 4B then remains connected to the rest of the enclosure 4 (and thus to the rest of the launching device 1) by means of the connection means 10 and the initiation and damping means 13A and 13B, and can be routed, together with said rest of the device 1, to a neutralisation zone (graveyard orbit) or a destruction zone.

The invention claimed is:

1. A device for successively launching two satellites, comprising:
   a cover including a first shell and a second shell defining a cavity therein, said first shell and said second shell being releasably coupled; and
   an enclosure including a fixed part and a removable part defining an inner volume, said removable part being capable of passing from a first position for which said enclosure is closed to a second position for which said enclosure is open;
   a first connection means coupled to said enclosure to releasably couple a first satellite to an upper portion of said enclosure, wherein said inner volume is sized and configured to receive a second satellite therein, wherein said releasable part transitions from a closed position to an open position after separation of said first satellite and enclosure, and wherein said second satellite is released from said inner volume when said removable part is in an open position, wherein said cavity is sized and configured to receive said enclosure and said first satellite therein; and
   a second connection means between said fixed part and said removable part, said second connection means being arranged so that when said removable part is in said second position, said removable part remains attached to said fixed part, wherein the second connection means is arranged so that when said removable part is in said second position, said fixed part and said removable part create an opening in the enclosure through which the satellite can be released.

2. A device for successively launching two satellites, comprising:
   a cover including a first shell and a second shell defining a cavity therein, said first shell and said second shell being releasably coupled; and
   an enclosure including a fixed part and a removable part defining an inner volume, said removable part being capable of passing from a first position for which said enclosure is closed to a second position for which said enclosure is open;
   a first connection means coupled to said enclosure to releasably couple a first satellite to an upper portion of said enclosure, wherein said inner volume is sized and configured to receive a second satellite therein, wherein said releasable part transitions from a closed position to an open position after separation of said first satellite and enclosure, and wherein said second satellite is released from said inner volume when said removable part is in an open position, wherein said cavity is sized and configured to receive said enclosure and said first satellite therein; and
   a second connection means between said fixed part and said removable part, said second connection means being arranged so that when said removable part is in said second position, said removable part remains attached to said fixed part, wherein the second connection means comprise a hinge-type connection.

3. A device for successively launching two satellites, comprising:
   a cover including a first shell and a second shell defining a cavity therein, said first shell and said second shell being releasably coupled; and
   an enclosure including a fixed part and a removable part defining an inner volume, said removable part being capable of passing from a first position for which said enclosure is closed to a second position for which said enclosure is open;
   a first connection means coupled to said enclosure to releasably couple a first satellite to an upper portion of said enclosure, wherein said inner volume is sized and configured to receive a second satellite therein, wherein said releasable part transitions from a closed position to an open position after separation of said first satellite and enclosure, and wherein said second satellite is released from said inner volume when said removable part is in an open position, wherein said cavity is sized and configured to receive said enclosure and said first satellite therein; and
   a second connection means between said fixed part and said removable part, said second connection means being arranged so that when said removable part is in said second position, said removable part remains attached to said fixed part,
   wherein the second connection means comprise means for initiation and damping of the movement of the removable part when said removable part passes from said first position to said second position.

4. The device according to claim 3, wherein the initiation and damping means comprise pneumatic springs fixed to said fixed part and to said removable part.

5. The device according to claim 1, wherein said removable part can pass from said first position to said second position under the action of controllable closure/opening means.

6. The device according to claim 2, wherein said removable part can pass from said first position to said second position under the action of controllable closure/opening means.

7. The device according to claim 3, wherein said removable part can pass from said first position to said second position under the action of controllable closure/opening means.

* * * * *